United States Patent [19]
Wiltrout

[11] 3,774,625
[45] Nov. 27, 1973

[54] CARWASH WATER RECLAIM SYSTEM
[75] Inventor: Dale E. Wiltrout, Paterson, N.J.
[73] Assignee: Ultradynamics Corporation, Paterson, N.J.
[22] Filed: Feb. 9, 1972
[21] Appl. No.: 224,785

[52] U.S. Cl................ 134/104, 134/109, 134/123, 210/167
[51] Int. Cl........................... B08b 3/10, B60s 3/04
[58] Field of Search.................... 210/167; 134/104, 134/109, 111, 45, 123

[56] References Cited
UNITED STATES PATENTS

| | | | |
|---|---|---|---|
| 2,139,096 | 12/1938 | Piquerez | 134/111 X |
| 2,419,397 | 4/1947 | Frohoff et al. | 134/123 |
| 2,862,222 | 12/1958 | Cockrell | 134/123 X |
| 2,922,173 | 1/1960 | Lind et al. | 134/123 X |
| 3,259,138 | 7/1966 | Heinicke | 134/45 |
| 3,263,341 | 8/1966 | Allen | 134/123 X |
| 3,378,018 | 4/1968 | Lawter | 134/123 X |
| 3,421,526 | 1/1969 | Alkire et al. | 134/123 X |
| 3,464,631 | 9/1969 | Lieffring et al. | 134/123 X |
| 3,550,778 | 12/1970 | Kesselman | 210/167 |

*Primary Examiner*—Robert L. Bleutge
*Attorney*—Maxwell E. Sparrow et al.

[57] ABSTRACT

A recycle arrangement in which wash water containing grit and particles is collected and treated in a cyclone which removes the solid particles from the water, and disposes of the solids in the form of sludge. The treated water is reclaimed for subsequent washing purposes. After washing, the surface is rinsed with water collected and passed through filters after the rinsing to remove soap, detergents, and other impurities so as to produce clear reusable water. The resulting clear water is then reclaimed and recycled for subsequent rinsing purposes.

18 Claims, 5 Drawing Figures

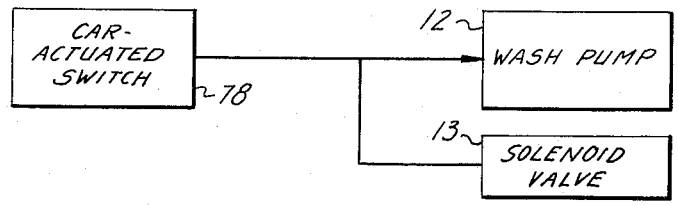
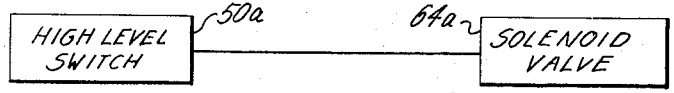
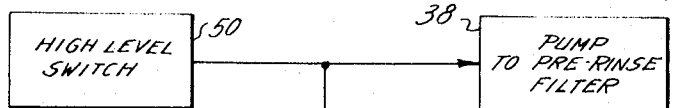
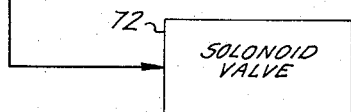
FIG.3
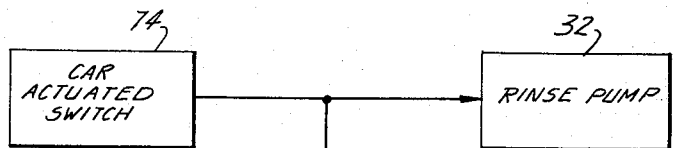
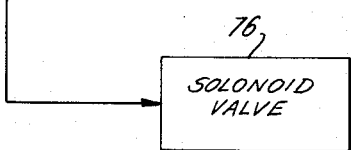
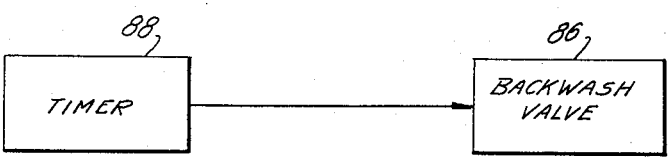

CARWASH WATER RECLAIM SYSTEM

BACKGROUND OF THE INVENTION

The conservation of water has become an important issue in current environmental control programs enforced by cities, states, and local municipalities. Water conservation becomes particularly important when prolonged time intervals prevail during which no rainfall occurs in local areas. When water shortages occur as a result of consumption being greater than is tolerable from the viewpoint of available water in the reservoirs, washing operations are often prohibited by local law, whenever fresh water is continuously used for washing purposes. Such conservation laws generally do not apply to uses of water, when the water is recycled or reclaimed.

SUMMARY OF THE INVENTION

It is an object of the present invention to provide an arrangement for the washing or laundering of vehicles and containers, in which the water used for washing and rinsing purposes is reclaimed for reuse.

It is another object of the present invention to provide an arrangement, as set forth, in which the reclaimed water is sufficiently free of suspended matter and impurities such as particles, grit, road film, oil, etc., so as to prevent scratching and spotting of the surface of the article being washed.

It is a fruther object of the present invention to provide a reclaim system which may be readily fabricated and assembled.

A still further object of the present invention is to provide a reclaim system which properly treats the water for reuse by physical and chemical means and is simple to operate. It is also a specific object of the present invention that the water reclaiming system may be economically maintained.

The objects of the present invention are achieved by providing an arrangement in which the vehicle or container is first subjected to a spray of wash water which has been treated by a cyclone for the removal of suspended matter such as grit and sludge particles. After treatment of the water by the cyclone, the resulting clarified water is reused for a subsequent washing. The water treated by the cyclone, however, still contains soap and detergents and, for this reason, is used for washing purposes only, as distinguished from rinsing. The water used for rinsing purposes is clear water and is passed through a series of filtering tanks which remove the impurities such as suds, soap, detergents, road film and oil which enter from the initial washing of the car surface. Filtering is performed within a sequence of tanks containing special minerals such as activated carbon, for example. After the filtering tanks have been used for a number of cycles, the filtering tanks are back-washed for the purpose of rejuvenating or cleaning the filtering action of the tanks. The pressure drop across the filtering tanks is measured to determine the appropriate time at which the back-wash process is applied. Chemical feeders are connected to the lines for the wash water and the rinse water for injecting chemicals to retard bacteria growth, and chemically balance the water for reuse.

Various further and more specific purposes, features and advantages, will clearly appear from the detailed description given below taken in connection with the accompanying drawings which form part of this specification and illustrate merely by way of examples, certain embodiments of the device of the invention.

BRIEF DESCRIPTION OF THE DRAWING

In the following description and in the claims, parts will be identified by specific names for convenience, but such names are intended to be as generic in their application to similar parts as the art will permit. Like reference characters denote like parts in the several figures of the drawings, in which

FIG. 3 is an electrical circuit diagram of the controlling circuitry used to control the flow of fluids through the arrangement of FIG. 1;

DESCRIPTION OF THE PREFERRED EMBODIMENTS

Figure 1:
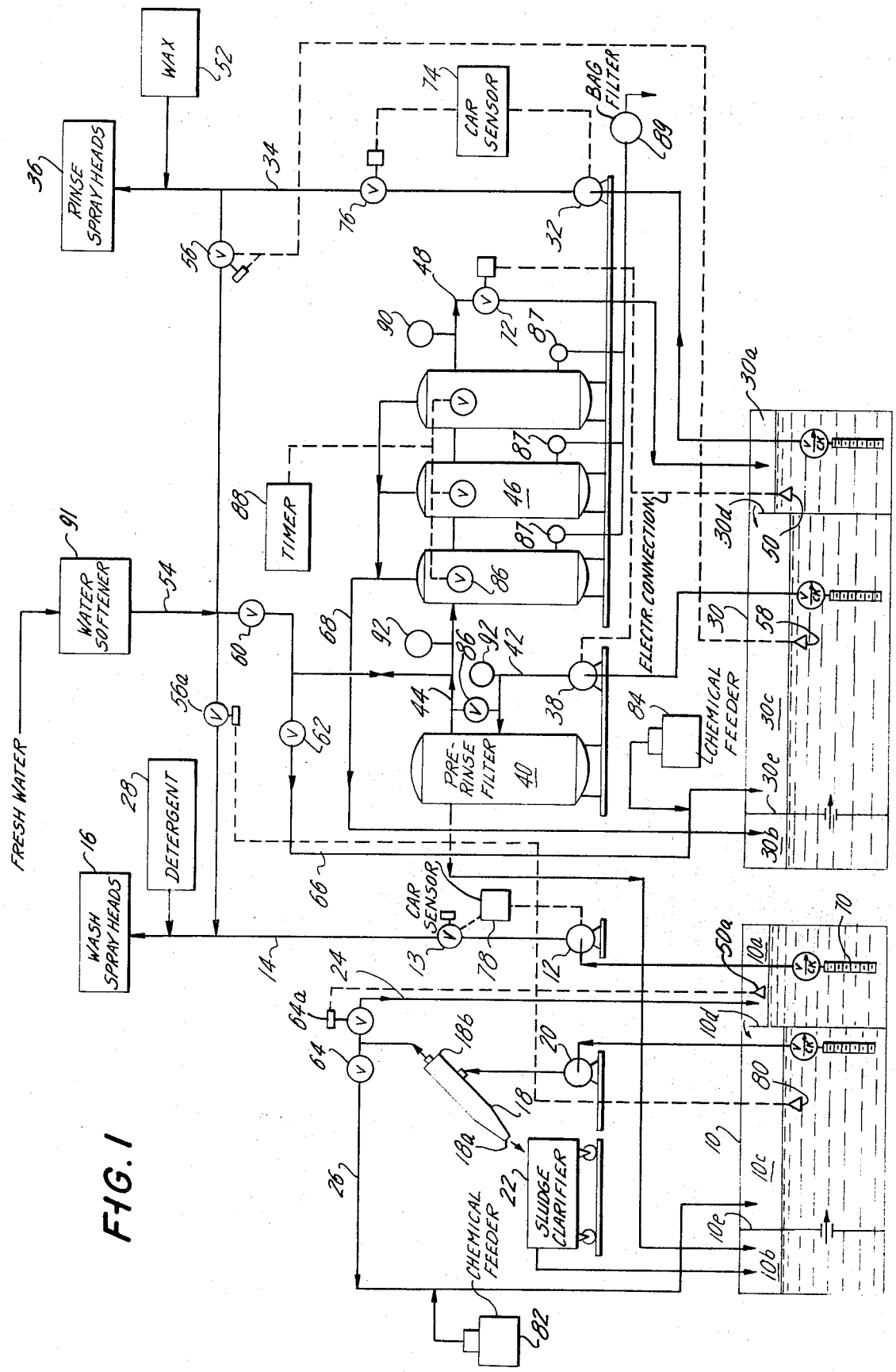
FIG. 1 is a schematic diagram of the reclaim system, in accordance with the present invention.

Referring to the drawing and, in particular, to FIG. 1, an article to be washed is conveyed over the wash pit 10. As the article arrives over the wash pit 10, a switch is actuated as, for example, by the bumper of a car, and upon closure of this switch, a wash pump 12 commences to operate. The wash pump 12 pumps water from the storage section 10a of the pit, and into the line 14 leading directly to spray heads from which the wash water from the pit emerges directly onto the article. The water passing out of the spray heads 16 contains soap and detergents, but is free from grit and other solid particles which might be classified as sludge and which would ordinarily scratch the surface of the article, as a car for example, if it were to be present within the spray water.

After having been applied over the article, the wash water runs down off the article and drains into the area 10b of of the wash pit 10, which acts as a skimmer. The wash water draining into the section 10b of the wash pit contains the grit and solid particles picked up as a result of washing the article which was conveyed over the wash pit. This wash water is then passed from the section 10b of the wash pit to section 10c. To remove the grit and solids from the wash water, the latter is pumped from the section 10c into a cyclone 18 by a pump 20. The cyclone 18 is a conventional device used to separate solids or sludge particles from a fluid water. Thus, the cyclone 18 serves as a separator of the sludge and the water. The sludge, after separation, passes out of the end 18a of the cyclone, and into a sludge cart 22. The cleaned water, on the other hand, passes out of the cyclone at the end 18b from which the largest proportion of the water is passed into the line 24 leading directly into section 10a of the wash storage pit or tank until full.

A proportion of the cleaned water passing out of the end a b of the cyclone is transmitted into the branch line 26 for recirculation into section 10c of the wash pit. Thus, a proportion of the water treated by the cyclone 18 is continually returned into the wash pit for further re-treating, rather than applying it directly to the car. Such an arrangement, in which a portion of the cyclone-treated water is returned for retreatment by the cyclone, results in an improved quality of the wash water applied to the surface. This amount of water returned to the wash pit section 10c for further treatment, through line 26, may be, for example, approximately 25 percent of the water leaving the end 18b of the cyclone when section 10a is low, and 100 percent when section 10a is full. This flow is controlled by level control 50a and shut-off valve 64a.

Valve 64a remains open until sufficient water treated by the cyclone fills the section 10a of the wash pit to the extent that water overflows from section 10a into 10c, by passing over the partition 10d. When water overflows from section 10a of the wash pit, in this manner, sufficient treated water is always available to the wash operation through pump 12. At that point, valve 64a closes and the entire flow is directed to line 26. The water flowing through the line 14 and into the spray head 16, is substantially light-weight water which includes soap and detergents. This water is reused only for washing purposes, and not for rinsing the car afterwards. Detergent is applied to the wash water from a source 28 as needed.

After the article fom18 moved from over the wash pit by a conveyor, for example, the pump 12 ceases to deliver wash water to the wash spray heads 16. As the article is moved further over the rinse pit storage section a rinsing procedure is applied for the purpose of rinsing off the wash water remaining on the surface, and to leave the surface in a clean and waxed condition.

The actuation of a switch by, for example, the bumper of a car, as in the case where a car arrives over the wash pit, causes the pump 32 to commence operating and to draw rinse water from the storage section 30a of the rinse pit. The water pumped from this section 30a of the rinse pit, is passed into line 34 leading directly to the rinse spray heads 36. After the rinse water has been applied to the car surface and it flows off the car, the water drains into section 30b of the rinse pit, which acts as a skimmer. From the latter section, the water is then passed into the section 30c.

To cleanse the rinse water present in the section 30c of the rinse water pit, the pump 38 draws water from section 30c and passes the water into a pre-rinse filter 40. The pre-rinse filter 40 functions as a dirt or mud filter to remove whatever grit and dirt particles remained on the surface and were removed by the rinse water. After being pumped into the pre-rinse filter 40 through line 42, the water emerges from this filtering tank 40 through line 44 and passes through filtering tanks 46. This filter 46 serves to remove soap, detergent, color and other impurities from the rinse water so as to leave clear reusable water. In order to achieve such filtering of the water, the filtering tank 46 contains special minerals, as, for example, activated carbon.

The processing capacity of a filtering tank 46 is substantially limited, and only a predetermined flow rate in gallons per minute, for example, can be accommodated by a single tank 46. In order to process a larger quantity of rinse water, therefore, a series of tanks 46 are connected in parallel, so that each tank can carry a proportion of the water load to be treated or filtered. Thus, the water from the supply line 44 is distributed among the three tanks 46 shown in the drawing and these three tanks are able to process a substantially larger flow rate than would be possible with only a single tank. With the three tanks connected in parallel, as, for example, in the drawing, substantially three times the flow rate of one tank can be accommodated. After passing through the filtering tanks 46, the cleansed rinse water flows through the line 48 and into the storage section 30a of the rinse pit.

The pump 38 continues to operate for the purpose of cleansing the rinse water until the level of the storage pit secton 30a is sufficiently high so as to overflow into section 30c, by way of the partition 30d within the rinse pit. When this condition is reached, a liquid level sensor 50 within the pit section 30a switches off the pump 38. The rinse spray heads 36 also cease to apply water to the car, after the pump 32 ceases to operate when the car has been moved from over the rinse pit 30. To leave a polished and waxed surface on the car after the rinsing action, wax is passed from a source 52 into the line 34 leading to the rinse spray heads 36.

After the filters 46 have been used repeatedly for reclaiming the rinse water, the filtering agents within the tank incur reduced filtering efficiency to the extent that they cannot perform, after a period of time, satisfactory filtering action. when that point is reached, it is essential to rejuvenate or reactivate the filtering agents, so that they can again perform their assigned duties. To reactivate or rejuvenate the filtering agents, the filtering tanks are back-washed. In this process, the rinse water from the line 44 is passed through tanks 46 in the opposite direction from which the water normally passes through the tanks while being filtered. Thus, under normal operating conditions, for example, the water from line 44 enters the filtering tanks 46 at the top and passes down to the bottom where it is accumulated after having been filtered during the passage through the tanks from the top to the bottom thereof. During backwash, the water from line 44 is transmitted through tanks 46 in the direction flowing from the bottom to the top, which is the reverse direction that prevails in flow under normal operating conditions in filtering action. It is possible to determine when, in the operation of filtering tanks, it becomes essential to back-wash the filters, by monitoring the pressure drop across the filtering tanks and observing when this pressure drop exceeds a predetermined magnitude. It is possible to maintain the filtering tanks in satisfactory operating condition by applying the back-wash process when this pressure drop has exceeded the predetermined magnitude. When after a number of back-wash cycles or operations the pressure drop across the tanks does not decrease significantly, it is an indication that the filtering agents within the tanks cannot be sufficiently rejuvenated or reactivated, and that they must, therefore, be replaced. This is done by blowing out the mineral, through valves 87, into bag filter 89.

As a result of evaporation and stray water losses, predeteriined heigh,, is essential to replenish the lost water with fresh water. This replenishing action is provided by the line 54 which passes fresh water directly into line 34 leading to the rinse spray heads upon opening of the solenoid valve 56. This solenoid valve 56 is actuated by a fluid level indicator 58 within the rinse pit 30. When the water level section 30c of the rinse drops below pit a predetermined height, the fluid level indicator 58 transmits an electrical signal to the solenoid valve 56 to open this valve and thereby permit fresh water to flow from line 54 into line 34. The water losses are, thereby, replenished and the added fresh water from line 54 becomes finally accumulated within the rinse pit 30. The fresh water from line 54 is also passed into line 44, when the filtering tanks are subjected to the back-wash process. Thus, fresh water is used for the purpose of back-washing the filtering tanks for rejuvenating the filtering or chemical agents therein. A valve 60 is used for this purpose of controlling a flow of fresh water from line 54 into line 44, leading into the filtering tanks.

A predetermined fraction or proportion of the water emerging from pre-rinse filter 40 is immediately recirculated and returned back to the rinse pit, rather than being transmitted to the filtering tanks 46 for final passage through the spray heads 36. This procedure for recirculating a portion or fraction of the water treated by the pre-rinse filtering tank 40 serves to improve the quality of the rinse water. The principle on which this recirculation prevails is similar to that described in conjunction with the recirculating line 26 associated with the wash pit. Valves 62 and 64 are connected in lines 66 and 26, respectively, for controlling the amount of recirculated rinse water and wash water. Thus, by adjusting the setting of valves 62 and 64, the proportion of recirculated water may be varied or adjusted.

Water emerging from the filtering tanks 46 during the backwash process, is passed directly into line 68 leading into section 30b of the rinse pit. This back-wash water is then passed into section 30c, by way of the partition 30e, where it is treated with the remaining rinse water in that section for cleansing and filtering.

The wash pit 10 and rinse pit 30 are equipped with strainers and check valve combinations 70, for protecting the pumps 20, 12, 38 and 32 at their intake lines.

A solenoid valve 72 connected in line 48 is actuated by the fluid level indicator 50 when the level in section 30a of the rinse pit overflows into section 30c. When this overflow condition occurs, the fluid level indicator 50 transmits a signal to the solenoid valve 72 which closes this valve and prevents further filtered water from entering section 30a. At the same time, this fluid level indicator 50 also transmits a signal to pump 38 to cease operation, until more water is needed in section 30a.

The car sensor 74, when actuated by the bumper of the car, for example, turns on both pump 32 and valve 76 so as to initiate rinsing of the car after the latter has been positioned over the rinse pit 30 and has actuated thereby the sensor 74. A similar such sensor 78 commences the action of the wash spray heads 16, turns on pump 12 and opens valve 13 when the car has become positioned over the wash pit 10 and has actuated with its bumper, for example, said switch or sensor 78. A fluid level indicator 80 is provided to activate valve 56a when the fluid level within the wash pit 10 drops below a predetermined level, to assure an adequate supply of wash water for the car.

The low level controls 80 and 58 are prevented from opening fresh water solenoid valves 56a and 56 until water is needed at the spraying station, as dictated by actuators 78 and 74. This may be further seen from FIG. 3.

Chemical feeders 82 and 84 introduce chemical agents into the reclaimed wash water and rinse water for the purpose of retarding bacteria growth and chemically balancing the water while, at the same time, enabling the detergent to remain in the wash sump and decompose in the rinse sump. outlets In operation of the filtering tanks 40 and 46, the pressure difference between the inlets and outlets of these tanks are monitored through the pressure gauges 92 and 90 at the inlets and outlets respectively. When, for example, the pressure difference between these two gauges is of the order of 10 lbs. per square inch, the need for the back-washing process is indicated. This back-wash process he need also be applied periodically in an automatic manner through the use of a timer 88 connected to solenoid operated valves 86 which reroute the water from line 44 for back-wash purposes. Thus, the valves 86 are used to reroute the water during back-wash to that the water enters the tanks from the bottom rather than from the top, as is the nromal situation when using tanks 46 for filtering purposes. The timer 88 is a conventional unit which provides a circuit closure after the elapse of a predetermined time interval. This time interval can be adjusted and set manually on the timer 88. The timer is connected electrically to the solenoid valves 86, so that when the predetermined time interval has elapsed, the valves 86 are actuated for the purpose of then rerouting the water for initiating the back-wash process. Thus, with the timer 88, the back-wash process can be applied periodically in an automatic manner without requiring manual attention.

The filter 40 is sized to supply enough filtered back-wash water from sump 30c for filters 46 in the event a high level condition exists and fresh water cannot be used.

Reverse osmosis is further used to treat the filtered rinse water from filters 40 and/or 46, if dissolved salts are excessive, as might be caused by the carry-in on vehicles in winter areas. The reverse osmosis process fuctions substantially as a demineralizer, when needed due to high total dissolved solids. In the reverse osmosis process, metal shells or permeators are packed with hollow, semi-permeable fibers. A large number of fibers is used to create a large semi-permeable surface area in a shell. In osmosis, pure water diffuses through the semi-permeable membrane to dilute the salt solution. The effective driving force is called osmotic pressure. Reverse osmosis occurs when the pressure on the salt solution is greater than the osmotic pressure. Fresh water then diffuses through the membrane in the opposite direction and is collected.

Chemical and static reactions and their balancing are an essential feature of the present invention. The vehicle surface of a car develops an anionic charge as it moves, collecting cationic road film. This is stripped during the wash operation by the friction of the wash high pressure spray and is replaced by a highly cationic wax for dewatering the car and to minimize spotting. The present invention uses a neutral non-ionic biodegradable detergent, in contrast to the common or usual anionic detergents that are commercially available. The mixing of an anionic detergent and a cationic wax causes a sticky scum to form, making the reclaim of water substantially difficult. The sump collection design of the present invention is another essential feature. The first compartment functions as a skimmer with a water flow-through near the bottom, and the remainder of the sump uses the principle of laminar flow for solids fall-out. Baffles are not used in the present invention as they cause turbulence and will not allow any clarification of the water end-to-end. Baffles also make some cleaning substantially more difficult.

Figure 2:
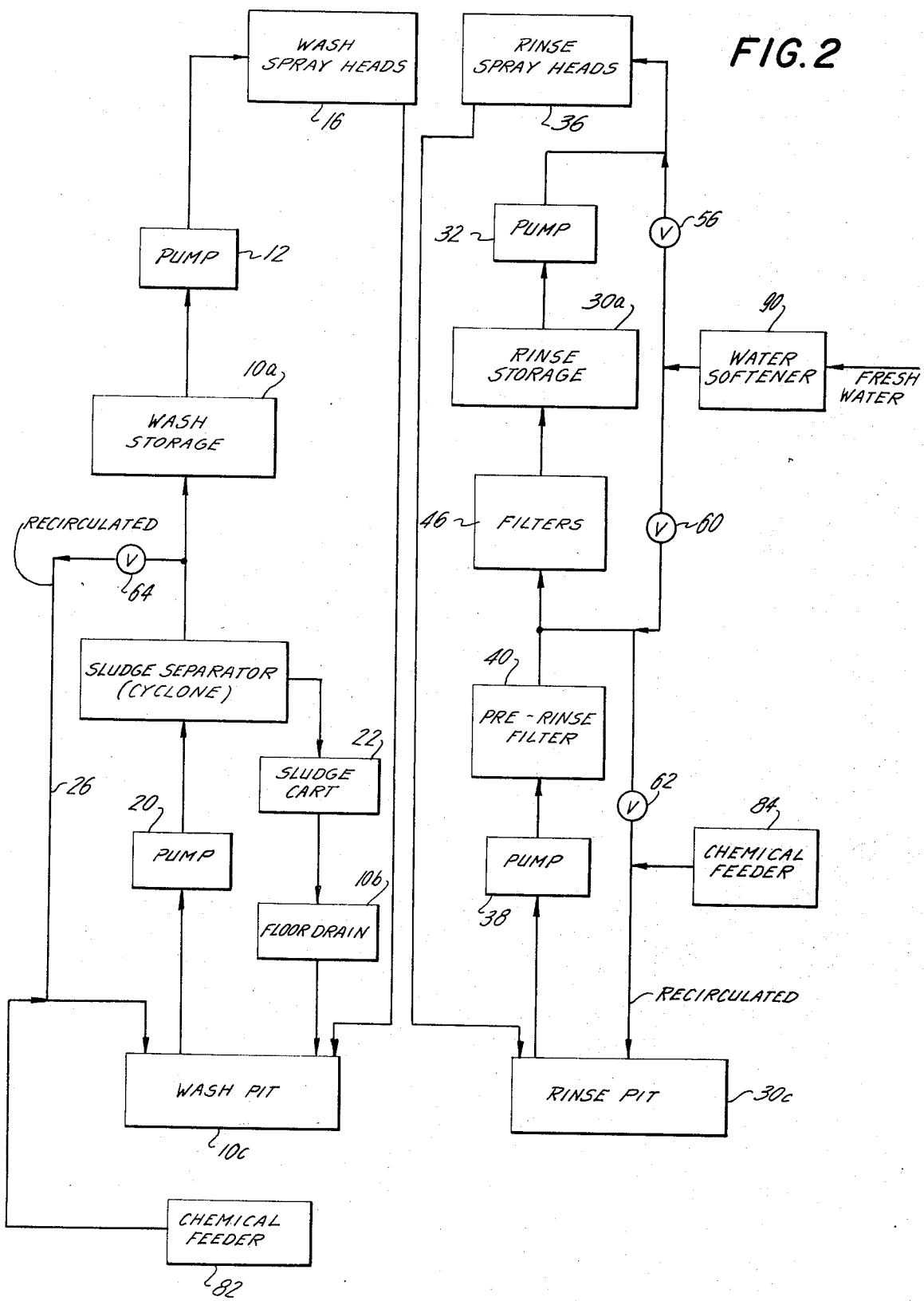
FIG. 2 is a block flow diagram, and shows the processes and direction of flow of the arrangement of FIG. 1.

FIG. 2 is a flow diagram which shows the essential flow lines associated with washing, and then rinsing in order to remove the soap suds and detergent, and to apply a waxing surface. In order to provide clarity, FIG. 2 shows only the principal lines of flow and some of the essential valves, taken from the schematic diagram of FIG. 1. A water softener 90 is included for the purpose of first softening the fresh water before it is applied to replenish the lost water in the system. FIG. 2 serves to aid in the analysis of the flow lines of the water through the system used to reclaim the water applied to a washing and rinsing operation.

FIG. 3 shows the main electrical interconnection through which the reclaim system, in accordance with the present invention, is controlled. The reference numerals of the controlled and the controlling components in FIG. 3 correspond to those used in FIG. 1. Accordingly, the operational description of the controlling function associated with FIG. 3, may be obtained from the description above, given in relation to FIG. 1.

Figure 4:
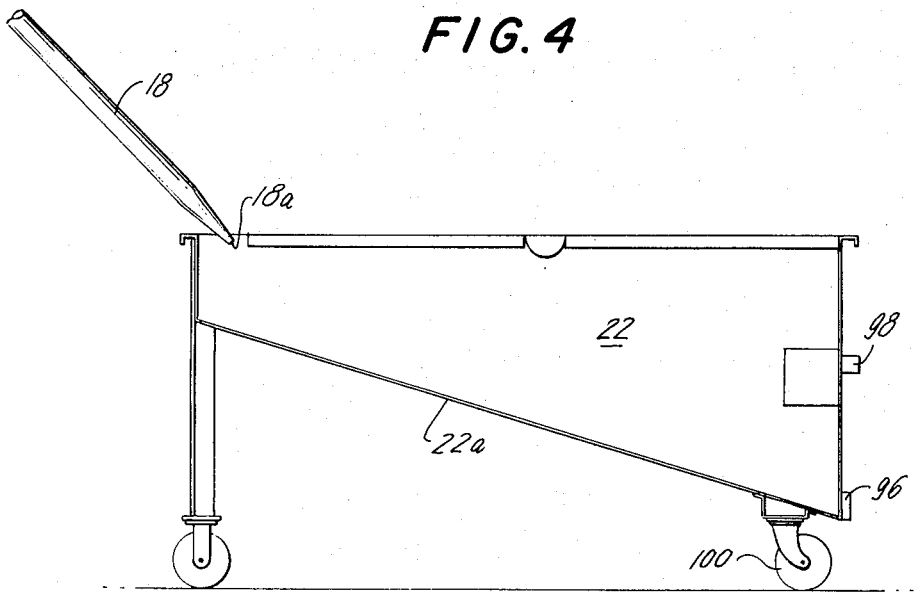
FIG. 4 is front view of the sludge-clarifying cart used in the arrangement of FIG. 1.
Figure 5:
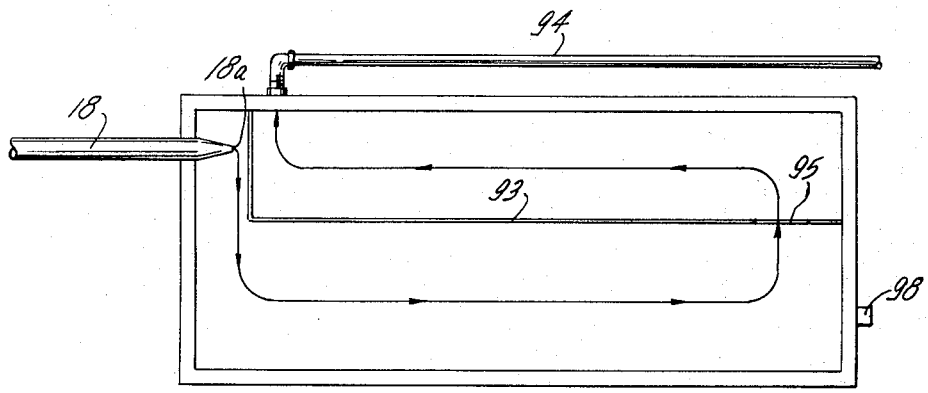
FIG. 5 is a plan view of the cart of FIG. 4.

In accordance with the present invention, the sludge cart 22 shown in FIGS. 4 and 5, is designed so as to further produce separation of the sludge or solids from the water emerging at the outlet 18a from the cyclone 18, and to produce thereby additional clear water. The cyclone 18 empties into the sludge cart 22, at substantially one corner of the cart. Fluid from the cyclone then is routed through a baffle plate or partition 92 along the length of the cart, but confined to substantially only a portion of the full width of the cart. The direction of flow of the water discharged from the cyclone, is shown in FIG. 5. After having travelled along the length of the cart, the water then is routed through a cut-out 92a in the baffle plate 92, and is passed into the remaining portion of the cart width. After then returning to the initial end of the cart, the water is permitted to pass through an overflow drain line 94. The routing of the discharge from the cyclone, in this manner, through the cart 22, serves to further separate sludge or solids and to produce clear water flowing through the discharge drain 94. The bottom of the cart 22 has a slope member 22a onto which the sludge or solids can settle. The accumulated sludge or solids can then be removed or tapped from a bottom tap 96. A decanting tap 98 is, furthermore, provided for tapping clear water prior to reaching the overflow line 94. The entire cart 22 is mounted upon swivel wheels 100 which permit the cart to be transported to an appropriate site, when desired, for purposes of tapping off the sludge accumulated within the cart.

Whereas separate wash pits and rinse pits are illustrated in the embodiment described, so as to permit washing of a car as it is moved along, it is also quite possible to have the car stationary and to have the washing and rinsing equipment in movable form. In this case, only one pit becomes necessary for executing the washing and rinsing properties, since the car in such a process is stationary.

While the invention has been described and illustrated with respect to certain examples which give satisfactory results, it will be understood by those skilled in the art, after understanding the principles of the invention, that various changes and modifications may be made without departing from the spirit of the invention.

I claim:

1. A system for reclaiming fluids from wash and rinse operations comprising, in combination,
   a. used wash fluid receiving means for receiving wash fluid draining from the surface of a vehicle, container, or the like being washed by washing means;
   b. means for separating sludge from the used wash fluid;
   c. means operable to convey used wash fluid from said receiving means to said sludge separating means;
   d. a storage area operable to receive and hold used wash fluid after separation of sludge;
   e. means operable to convey wash fluid from said storage area to the washing means in the wash operation;
   f. used rinse water receiving means for receiving rinse water draining from the surface of the vehicle, container, or the like being rinsed by rinsing means;
   g. used rinse water filtering means;
   h. means operable to convey used rinse water from said rinse water receiving means to said filtering means;
   i. a rinse water storage area operable to receive filtered rinse water emerging from said filtering means;
   j. means operable to convey rinse water from said rinse water storage area to the rinsing means in the rinse operation; and
   k. means for periodically backwashing said filter means.

2. The system as defined in claim 1 wherein said sludge separating means comprises a cyclone separator.

3. The system as defined in claim 2 including sludge receiving means in operative communication with said cyclone for receiving sludge separated from said wash fluid by said cyclone separator.

4. The system as defined in claim 1 including means for diverting from said wash fluid storage area wash area emerging from said sludge separating means to said used wash fluid receiving means for further sludge removal.

5. The system as defined in claim 4 including fluid level sensing means in said wash fluid storage area operable to determine when the wash fluid is at a predetermined level and means associated with said fluid level sensing means operable to divert all the wash fluid emerging from said sludge separating means to said receiving means when said level is reached and to redirect at least some of said wash fluid emerging from said sludge separating means to said wash fluid storage area when wash fluid is below the predetermined level.

6. The system as defined in claim 1 including means to replenish said wash fluid.

7. The system as defined in claim 6 wherein said replenishing means includes reclaim chemical addition means and fresh water addition means.

8. The system as defined in claim 7 including means for conveying the backwash from said filtering means to said wash fluid replenishing means.

9. The system as defined in claim 1 wherein said rinse water filtering means comprises a plurality of filters.

10. The system as defined in claim 9 wherein said rinse water filtering means comprises a first filter and a plurality of second filters connected to said first filter for further filtering rinse water after passing through said first filter.

11. The system as defined in claim 1 including means for timing the interval after which said means operable to said backwash said filtering means are activated.

12. The system as defined in claim 1 including pressure sensing means associated with said filtering means, said sensing means being operable to backwash said filtering means upon a predetermined difference in the pressure being sensed by said pressure sensing means.

13. The system as defined in claim 1 including means for diverting rinse water emerging from said filtering means from said rinse water storage area to said used rinse water receiving means for further filtering.

14. The system as defined in claim 13 including fluid level sensing means in said rinse water storage area operable to determine when the said rinse water is at a predetermined level and means associated with said fluid level sensing means operable to divert all rinse water emerging from said filtering means to said used rinse water receiving means, when said level is reached and to redirect at least some of said rinse water emerging from said filtering means to said rinse water storage area when rinse water is below the predetermined level.

15. The system as defined in claim 1 including means to replenish said rinse water with fresh water.

16. A system for reclaiming fluids from wash and rinse operations comprising in combination
   a. a used wash fluid receiving means for receiving wash fluid draining from the surface of a vehicle, container, or the like being washed by washing means;
   b. a cyclone separator for removing sludge from the used wash fluid;
   c. means operable to convey used wash fluid from said receiving means to said sludge separating means;
   d. a storage area operable to receive and hold used wash fluid after separation of sludge;
   e. a fluid level sensor in said wash fluid storage area operable to determine when the wash fluid is at a predetermined level;
   f. valve means associated with said fluid level sensor and operable to divert all the wash fluid emerging from said cyclone to said wash fluid receiving means when said level is reached for recycling and to redirect at least some of said wash fluid emerging from said cyclone to said wash fluid storage area when wash fluid is below the predetermined level;
   g. means operable to convey wash fluid from said storage area to the washing means in the wash operation;
   h. used rinse water receiving means for receiving rinse water draining from the surface of the vehicle, container, or the like being rinsed by rinsing means;
   i. used rinse water filtering means including a plurality of filters;
   j. means operable to convey used rinse water from said rinse water receiving means to said filtering means;
   k. a rinse water storage area operable to receive filtered rinse water emerging from said filtering means;
   l. a fluid level sensor in said rinse water storage area operable to determine when the said rinse water is at a predetermined level;
   m. valve means associated with said fluid level sensor operable to divert all rinse water emerging from said filtering means to said used rinse water receiving means for further filtering when said level is reached and to redirect at least some of said rinse water emerging from said filtering means to said rinse water storage area when rinse water is below the predetermined level;
   n. means operable to convey rinse water from said rinse water storage area to the rinsing means in the rinse operation; and
   o. means for periodically backwashing said filter means, said backwashing means including pressure sensing means at the inlet and outlet of said filtering means and operable to initiate backwash of said filtering means upon sensing a predetermined difference in pressure across said filtering means.

17. The system as defined in claim 16 including means to replenish said wash fluid and said rinse water, comprising chemical addition means and fresh water addition means.

18. The system as defined in claim 17 including means for conveying the backwash fluid from said filtering means to said wash fluid replenishing means.

* * * * *